United States Patent [19]
Kappler et al.

[11] Patent Number: 5,762,820
[45] Date of Patent: Jun. 9, 1998

[54] BINDER FOR SELF-CROSSLINKABLE VARNISHES AND PAINTS

[75] Inventors: Patrick Kappler, Ecully; Jean-Luc Perillon, St-Paul Les Trois Chateaux; Catherine Savary, St Aubain le Vertueux, all of France

[73] Assignee: Elf Atochem S. A., Puteaux, France

[21] Appl. No.: 668,211

[22] Filed: Jun. 21, 1996

[30] Foreign Application Priority Data

Jun. 23, 1995 [FR] France ................... 95 07568

[51] Int. Cl.$^6$ ........................................... C08F 8/00
[52] U.S. Cl. ................... 525/108; 524/520; 525/107; 525/208; 526/245; 526/255
[58] Field of Search ........................ 526/245, 255; 524/520; 525/107, 108, 208

[56] References Cited

U.S. PATENT DOCUMENTS

| | | | |
|---|---|---|---|
| 4,365,049 | 12/1982 | Tsunoda et al. | 526/245 |
| 5,140,082 | 8/1992 | Watanabe et al. | 526/255 |
| 5,403,900 | 4/1995 | Wu et al. | 526/255 |

*Primary Examiner*—Melvyn I. Marquis
*Attorney, Agent, or Firm*—Pennie & Edmonds LLP

[57] ABSTRACT

The invention relates to binders for self-crosslinkable varnishes and paints comprising one or a number of hydroxylated and/or carboxylated fluorinated copolymers and one or a number of epoxidized and/or alkoxylated acrylic copolymers.

The varnishes and paints in which these binders are carried out are self-crosslinkable that is to say they do not need any crosslinking agent

19 Claims, No Drawings

BINDER FOR SELF-CROSSLINKABLE VARNISHES AND PAINTS

The subject of the present invention is binders for crosslinkable varnishes and paints, therefore described as self-crosslinkable varnishes and paints because in order to be crosslinked, these varnishes and paints require neither compounds of isocyanate type nor compounds of melamine/formaldehyde type. The binders according to the invention comprise one or a number of hydroxylated and/or carboxylated fluorinated copolymers and one or a number of epoxidized and/or alkoxylated acrylic copolymers. It is known that crosslinkable compositions by means of compounds of isocyanate or melamine/formaldehyde type which are based on a fluorinated polymer have good ageing behaviour, good resistance to solvents and good mechanical strength, in particular hardness. In addition, their ability to be put into the form of adhesive films is excellent, which ability encompasses many substrates, that is to say of not requiring an adhesion primer, and of having very good flexibility. But these crosslinking agents are generally toxic compounds which require precautions during their handling and the resulting compositions suffer from a degree of stiffness. In the case of compositions crosslinked using isocyanate compounds, any free isocyanates which have not reacted with the hydroxylated fluorinated polymer can freely migrate, thus restricting the field of use of these compositions. Coating films based on the binders according to the invention have the additional advantage of being self-adhering.

Self-crosslinkable compositions comprising a fluorinated olefin copolymer carrying hydroxyl or acid groups, an acrylic copolymer carrying ester and acid groups and an acrylic copolymer carrying hydroxyl or epoxide groups are described in EP 572,254, on behalf of Nippon Paint. But these compositions, which are rather poor in fluorine, have poor resistance to ageing.

EP 567,154, on behalf of Asahi Glass, describes self-crosslinkable compositions comprising a fluorinated copolymer carrying hydroxyl and epoxide groups in combination with various crosslinking agents carrying acid or acid anhydride groups such as methylhexahydrophthalic acid anhydride or fluorinated or acrylic copolymers carrying acid groups. Unfortunately, the fluorinated copolymers carrying hydroxyl and epoxide groups of these compositions are particularly unstable on storage, even at ambient temperature.

Hydroxylated and/or carboxylated fluorinated copolymers according to the invention are based on the following monomers:

①. from 45 to 85% (molar), and preferably from 60 to 70%, of vinylidene fluoride (VF2) and/or trifluoroethylene (VF3)

②. from 15 to 55% (molar), and preferably from 30 to 40%, of tetrafluoroethylene ($C_2F_4$)

③. from 5 to 25 mol per 100 mol of monomers ①+② of one or a number of allylic monomers chosen from hydroxylated allyl ethers and/or carboxylated allyl esters, such as $CH_2=CH—CH_2—O—(CH_2)_n—OH$ with $2 \leq n \leq 4$
$CH_2=CH—CH_2—(O—CH_2—CH_2)_n—OH$ with $1 \leq n \leq 4$
$CH_2=CH—CH_2—(O—CH_2—CH(CH_3))_n—OH$ with $1 \leq n \leq 4$
$CH_2=CH—CH_2—O—CH_2—CHOH—CH_2OH$
$CH_2=CH—CH_2—O—CH_2—CH—(CH_2—CH_3)—(CH_2OH)_2$
$CH_2=CH—CH_2—O—CO—C_6H_{10}—COOH$
$CH_2=CH—CH_2—O—CO—C_2H_4—COOH$
$CH_2=CH—CH_2—O—CH_2—CH_2—O—CO—C_6H_{10}—COOH$ and preferably per 100 mol of monomers ①+② from 10 to 25 mol of carboxylated allyl esters and from 0 to 10 mol of hydroxylated allyl ethers ④. from 0 to 20 mol per 100 mol of monomers ①+② of one or a number of monomers chosen from non-hydroxylated vinyl ethers, such as butyl vinyl ether ⑤. from 0 to 5 mol per 100 mol of monomers ①+② of one or a number of other fluorinated(meth)acrylate monomers chosen from trifluoroethylene(meth)acrylate and (meth)acrylates carrying at least one $CF_3—(CF_2)_m$ group, such as:

$CH_2=CH—O—CO—C_2H_4—C_6F_{13}$
$CH_2=CH—O—CO—C_2H_4—C_8F_{17}$.

Some of these fluorinated copolymers are described in particular in Patent Applications EP 396,444, EP 433,106 and EP 481,849 on behalf of the Applicant Company.

The acrylic copolymer or copolymers according to the invention are based on the following monomers:

from 50 to 90% (by mass) of one or a number of alkyl (meth)acrylate(s), such as methyl methacrylate (MMA), butyl acrylate (BuA) or ethyl (meth)acrylates, and from 10 to 50% (by mass), and preferably from 20 to 40%, of one or a number of alkyl(meth)acrylate monomers functionalized or substituted by alkoxy and/or epoxy groups, such as glycidyl(meth)acrylate (GLYMA), isobutoxymethylacryl-amide (IBMA), methoxyethyl methacrylate (EEMA), methoxymethyl methacrylate (MEMA) or epoxydicyclopentadiene (meth)acrylates:

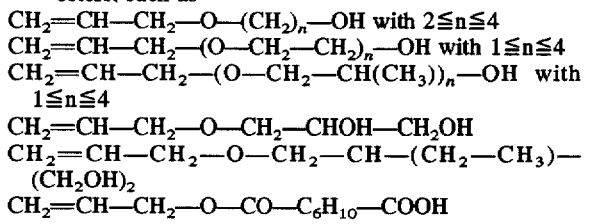

(ou H)

Another description of an embodiment of this invention is a binder for cross-linkable varnishes and paints comprising a plurality of fluorinated copolymers containing chemical functionality selected from the group consisting of hydroxyl and carboxyl and a plurality of acrylic copolymers containing chemical functionality selected from the group consisting of epoxide and alkoxide, wherein the fluorinated copolymers are formed from the monomers (A), (B), (C), (D) and (E) wherein monomer (A) comprises from 45 to 85 (mole % ((A)+(B))) and is a monomer selected from the group consisting of vinylidene fluoride and trifluoroethylene;

monomer (B) comprises from 15 to 55 (mole % ((A)+(B))) and is tetrafluoroethylene;

monomer (C) comprises from (5 to 25 mole)/(100 mole ((A)+(B)) and is selected from the group consisting of hydroxylated allyl ethers and carboxylated allyl esters;

monomer (D) comprises (0 to 20 mole)/(100 mole ((A)+(B)) and is selected from the group of non-hydroxylated vinyl ethers; and monomer (E) comprises (0 to 5 mole)/(100 mole ((A)+(B)) and is selected from the group consisting of trifluoroethylene(meth)acrylate (meth)acrylate and (meth)acrylates containing at least one $CF_3—(CF_2)_m$ group, wherein m=5 to 7, and mixtures thereof; and wherein the acrylic copolymers are formed from monomers (F) and (G), wherein (F) comprises from 50 to 90% (by mass ((F)+(G)) and is selected from the group consisting of methyl methacrylate, butyl acrylate, ethyl(meth)acrylate and mixtures thereof; and (G) comprises from 10 to 50% (by mass ((F)+(G)) and is selected from the group glycidyl(meth)acrylate, isobutoxymethylacrylamide, methoxyethyl methacrylate, methoxymethyl methyacrylate or epoxydicylcopentadiene (meth)acrylates. A specific embodiment is one in which the acrylic copolymers are in the amounts by weight per 100 parts ((F) and (G)) of (35 to 45 parts) methyl methacrylate, (35–45 parts) butyl acrylate and (15–25 parts) isobutoxymethylacrylamide.

As the binders are most often provided in the form of organic solutions, it is preferable to synthesize the fluorinated copolymers and the acrylic copolymers directly in solution in the solvent which will be that used for the varnishes and/or paints. The solvents for the binders are generally organic solvents of ester or ketone type. In general, solvents with a boiling point of more than 100° C. are preferred to be carried out. Mention may be made, among preferred solvents, of tert-butanol, methyl, isopropyl and butyl acetates or methyl isobutyl ketone.

The fluorinated copolymers can be polymerized in solution, in particular in tert-butanol, methyl acetate or isopropyl acetate; see, for example, EP 396,444, EP 433,106 and EP 481,849 on behalf of the Applicant Company. After charging the organic solvent to the polymerization reactor, first the hydroxylated and/or carboxylated allylic monomer(s) and then VF2 and/or VF3 and $C_2F_4$ are introduced. After having brought the temperature to between 50° and 70° C., the polymerization initiator, preferably chosen from isopropyl perdicarbonate or tert-butyl perpivalate, is added. During polymerization and in order to keep the proportions of the various monomers in constant ratios, VF2 and/or VF3, $C_2F_4$ and the allylic monomer(s) are added, care being taken to keep the pressure constant. When all the monomers have been introduced, the temperature is lowered and the reactor is degassed, the unreacted fluorinated monomers being discharged. It is sometimes necessary to carry out a solvent transfer in order to have available the fluorinated copolymer in the desired solvent.

The solution of fluorinated copolymer(s), obtained for example by the process set out above, can be mixed with the acrylic copolymers which have already been synthesized or else the acrylic monomers (i.e. the monomers from which the acrylic copolymer or copolymers derive) can be directly copolymerized in the organic solvent in the presence of fluorinated copolymer(s).

The copolymerization of acrylic copolymers within the solution of hydroxylated and/or carboxylated fluorinated copolymer(s) can be carried out by adding all or a fraction of the acrylic monomers either continuously or by successive increments during polymerization. The polymerization temperature is generally between 40° and 90° C. Use may be made of mercaptan-type transfer agents to reduce the molecular masses and of radical initiators which are soluble in organic solvents generally chosen from initiators of azo type, peroxydicarbonates, perpivalates and diacyl peroxides. Mention may be made, by way of example, of azobisisobutyronitrile, cyclohexyl perdicarbonate or tert-butyl perlpivalate.

The functionalized acrylic copolymers according to the invention can be synthesized by the processes commonly used for acrylic copolymers: solution, emulsion or suspension radical polymerization. The polymerization temperature is generally between 40° and 95° C. The preferred radical initiators can be chosen from initiators of azo type, percarbonates, perpivalates and diacyl peroxides. In order to reduce the molecular masses of the acrylic copolymers, use may be made of mercaptan-type transfer agents.

If the acrylic copolymers are prepared by emulsion or suspension polymerization, they are provided in the powder form after drying and they can be dissolved in the solvent of choice.

The amount by weight of fluorinated copolymer(s) within the fluorinated copolymer(s) and acrylic copolymer(s) mixture is generally between 0.5 and 0.85. The binders according to the invention can be obtained by simple mixing of solutions respectively containing the fluorinated copolymers and the acrylic copolymers or mixing the solution containing the fluorinated copolymers and the acrylic copolymers in the powder form. However, they can also be provided in the form of aqueous dispersions obtained from the above organic solutions dispersed in an aqueous solution of emulsifying agent(s) before removing the organic solvent either simultaneously by distillation or after the dispersion.

The copolymers can be dispersed using dispersers or homogenizers capable of dispersing a large amount of mechanical energy into mixtures of immiscible liquids. These devices make it possible to produce emulsions of "oil in water" type by virtue of the addition of appropriate emulsifying agent(s). The aqueous solution/copolymer solution mixture is subjected to intense shearing by a mechanical stirring system or by passing under pressure through nozzles. In general, the dispersion stage can be carried out in a temperature range of between 0° and 100° C. and preferably between 15° and 50° C.

The varnishes and paints can contain one or a number of pigments which can be of inorganic or organic type. Mention may be made, as examples of inorganic pigments, of titanium dioxide, iron or chromium oxides, mixed oxides of cobalt and aluminium, carbon black, molybdate orange, corrosion-inhibiting pigments, such as zinc phosphate, or metal pigments, such as aluminium.

It is also possible to add to the paint and/or to the varnish any ordinary adjuvant or additive for varnishes and paints such as dispersing agents, thickening agents of associative or non-associative type, agents intended to promote spreading, rheology-modifying agents, heat- and/or UV-stabilizing agents, antioxidants, antifoaming agents, agents for wetting the pigments and/or substrates, fungicides, bactericides, antifreezes, catalysts for the curing reaction of the paint, and the like so as fillers.

In order to limit either the heating temperature necessary for the crosslinking of the binders according to the invention or the residence time in the oven, it is preferable to add a catalyst generally chosen from Lewis acids. Mention may be made, by way of example, of sulphuric acid, methanesulphonic acid, para-toluenesulphonic acid, boron trifluoride, ferric chloride, tin chloride or certain titanates.

The paint and the varnish are prepared in a way known per se by mixing the different constituents.

The paints according to the invention can be applied to the substrates to be coated by any known technique such as air-fed spray gun, electrostatic, brush, roller, curtain coating, dipping or by electrodeposition.

The substrates to be coated can be metals (steel, galvanized steel, aluminium, and the like), plastics, such as PVC, polyesters or phenolic resins, glass, ceramics, wood or concrete. The said substrates may or may not be coated with primer and/or may be subjected to a surface treatment intended to promote adhesion of the paint, and the like.

In all the examples, the solids contents (SC) are expressed as % by weight.

Synthesis of the fluorinated copolymers according to F1 to F4

18 l of methyl acetate, 1.954 g of VF2, 763 g of $C_2F_4$ and 108 g of allyloxypropanediol are introduced, after deaeration, into a 30 l reactor equipped with a stirrer and a temperature control. After a temperature rise as far as 70° C., the pressure within the reactor then being 13 bars, 90 g of tert-butyl perpivalate are added. The pressure of 13 bars is kept constant by the introduction of a mixture of VF2 and $C_2F_4$ with the molar composition 65/35.

After each introduction of 177 g of this mixture, 41.4 g of allyloxypropanediol and 9.6 g of monoallyl hexahydrophthalate are introduced. In this way, 4074 g of 65/35 molar VF2/$C_2F_4$ mixture, 869 g of allyloxypropanediol and 202 g of monoallyl hexahydrophthalate are introduced.

Every hour, 27 g of tert-butyl perpivalate are introduced. The polymerization lasts 5 h 45.

The residual monomer is degassed. The solids content of copolymer solution is 25.6%. The molar composition of copolymer F1 is shown in Table 1.

Copolymers F2 to F4 are prepared according to the same process and their molar compositions are listed in Table 1.

TABLE 1

| Co-polymer No | MOLAR COMPOSITION | | | | | SC % |
|---|---|---|---|---|---|---|
| | VF2 | $C_2F_4$ | Allyloxy-propane-diol | Monoallyl hexahydro-phthalate | TRIFEMA | |
| F1 | 65 | 35 | 7.2 | 1.6 | — | 25.6 |
| F2 | 65 | 35 | 7.4 | 2.3 | — | 25.— |
| F3 | 65 | 35 | — | 8.3 | — | 29.3 |
| F4 | 65 | 65 | 11.3 | — | 0.15 | 26.— |

Synthesis of a fluorinated copolymer F5 carrying hydroxyl and epoxide groups (cf. EP 567,154)

A fluorinated copolymer carrying hydroxyl and epoxide groups is synthesized, according to the procedure described above and in the presence of 2 g of $K_2CO_3$, from the following monomers:

VF2/$C_2F_4$/allyl glycidyl ether/allyloxyethanol.

The degree of hydroxyl groups of F5 is equal to 1.8 meq/g and its degree of epoxide groups is equal to 1.5 meq/g.

The solids content of the copolymer solution in butyl acetate is 59.4%

Synthesis of the acrylic copolymers ACi

AC1: MMA/BuA/IBMA acrylic copolymer 350 g of methyl acetate and 2.5 g of cyclohexyl perdicarbonate are introduced into a 1 l reactor equipped with a jacket, a reflux condenser, a dropping funnel and a stirrer.

After deaeration, the temperature is brought to 50° C. and a mixture composed of 60 g of methyl methacrylate (MMA), 60 g of butyl acrylate (BuA) and 30 g of isobutoxymethylacrylamide (IBMA) is run into the reactor over 2 hours. Polymerization is continued for an additional 2 hours and the reactor is then cooled. The solids content of the copolymer formed in methyl acetate is 30%. The composition by weight of the acrylic copolymer is 40/40/20 MMA/BuA/IBMA.

AC2: MMA/BuA/GLYMA acrylic copolymer 350 g of methyl acetate and 2.5 g of cyclohexyl perdicarbonate are introduced into a 1 l reactor equipped with a jacket, a reflux condenser, a dropping funnel and a stirrer. After deaeration, the temperature is brought to 50° C. and a mixture composed of 60 g of methyl methacrylate, 60 g of butyl acrylate and 25 g of glycidyl methacrylate (GLYMA) is introduced into the reactor steadily over 1 hour. Polymerization is continued for 3 hours at 50° C. and the reactor is then cooled.

The solids content of the copolymer formed in methyl acetate is 28%. The composition by weight of the acrylic copolymer AC2 is 41/41/18 MMA/BuA/GLYMA.

AC3: MMA/BMA/HEMA/MAA acrylic copolymer 450 g of butyl acetate and 2.5 g of cyclohexyl perdicarbonate are introduced into a 1 l reactor equipped with a jacket, a reflux condenser, a dropping funnel and a stirrer. After deaeration, the temperature is brought to 60° C. and a mixture composed of 45 g of methyl methacrylate, 37.5 g of n-butyl methacrylate (BMA), 42 g of 2-hydroxyethyl methacrylate (HEMA) and 25.5 g of methacrylic acid (MAA) is introduced into the reactor steadily over 1 hour. Polymerization is continued for 4 hours at 60° C. and the reactor is then cooled.

The copolymer formed precipitates in butyl acetate. The composition by weight of the acrylic copolymer AC3 is 30/25/28/17 MMA/BMA/HEMA/MAA.

EXAMPLES 1 TO 3

Self-crosslinkable compositions

The self-crosslinkable compositions are prepared by simple mixing of a fluorinated copolymer Fi and of an acrylic copolymer ACj.

Example 1

Mixture of 586 g of the solution of copolymer F1 in methyl acetate and of 225 g of the solution of acrylic copolymer AC1 in methyl acetate (SC=25%).

Example 2

Mixture of 600 g of the solution of copolymer F2 in methyl acetate and of 225 g of the solution of acrylic copolymer AC2 in methyl acetate (SC=25%).

Comparative Example 3 according to EP 567,154

At the time of mixing F5 and AC3, F5 stored for 2 months in a closed flask placed in an enclosed area under artificial light at a temperature of 20°±2° C. exhibited a brown colour and had polymerized.

Manufacture of self-crosslinkable varnishes without isocyanate or melamine/formaldehyde from the preceding compositions The preceding compositions were put into the form of varnishes by addition of 0.2% by weight of para-toluenesulphonic acid with respect to the total weight of the fluorinated copolymer and of the acrylic copolymer.

Manufacture of varnishes crosslinkable by resins containing isocyanate or melamine/formaldehyde groups By way of comparison, varnishes were prepared from the solution of copolymer F1 without acrylic copolymer and containing a crosslinking agent with isocyanate groups (NCO-crosslinked F1) or composed of a melamine/formaldehyde resin (MF-crosslinked F1). By way of comparison, a varnish was prepared from Lumiflon® LF 200 from the Company Asahi Glass and from a crosslinking agent containing isocyanate groups (NCO-crosslinked Lumiflon). These 3 varnishes were crosslinked at 80° C. for 30 min.

Coating of substrates with the varnishes

A varnish film is deposited using a spiral scraper on a sheet made of chromed aluminium with no adhesion primer.

After evaporation of the methyl acetate, the varnish is placed in an oven for 30 min at 150° C. The thickness of the dry film is 20 µm.

7

48 h after application, the varnish is examined according to the following criteria:
gloss
hardness
impact
adhesion
bend
TF MEK The specular gloss at 20° is measured according to ASTM Standard D 523-85.

The Persoz hardness is measured according to NFT Standard 30-016 is 230 s.

The impact is expressed in cm for a weight of 1 kg.

The adhesion is measured according to NFT Standard 30-038. The value "0" corresponds to the maximum grade.

The resistance to bending is measured according to ISO Standard 3270. The value "0" corresponds to the maximum grade.

In order to judge the degree of crosslinking of the film, it is subjected to a series of rubbing movements with a cotton pad impregnated with methyl ethyl ketone until the appearance of the substrate. A number of to-and-fro movements (TF MEK) of less than 50 reflects poor crosslinking and a number greater than 100 reflects excellent crosslinking.

The combined results are given in Table 2 below:

TABLE 2

| Test | VARNISH | | COMPARATIVE | | |
|---|---|---|---|---|---|
| | Ex. 1 | Ex. 2 | NCO-cross-linked F1 | MF-cross-linked F1 | NCO-cross-linked Lumiflon |
| Gloss 20° | 600 | 70 | 100 | 60 | 65 |
| Hardness (s) | 266 | 300 | 300 | 330 | 250 |
| Impact (cm/kg) | >100 | >100 | 60 | 47.5 | 67.5 |
| Adhesion | 0 | 0 | 3 | 5 | 5 |
| Bend (T) | 0 | 0 | 1 | 2 | 1 |
| TF MEK | >200 | >200 | >200 | >200 | >200 |

Manufacture of self-crosslinkable paints without isocyanate or melamine/formaldehyde from the preceding compositions 71.2 g of $TiO_2$ (white pigment) are added to 400 g of copolymer F1 and the combined mixture is milled in a glass-bead mill for 45 min at 1500 rev/min. 0.2% by weight of para-toluenesulphonic acid with respect to the total weight of the fluorinated copolymer and of the acrylic copolymer is then added.

We claim:

1. Binder for cross-linkable varnishes or paints in organic phase or in aqueous dispersion comprising at least one hydroxylated or carboxylated fluorinated copolymer and at least one epoxidized or alkoxylated acrylic copolymer, wherein the fluorinated copolymer comprises the following monomers:

(1) from 45 to 85% (molar) of vinylidene fluoride (VF2) and/or trifluoroethylene (VF3)

(2) from 15 to 55% (molar) of tetrafluoroethylene ($C_2F_4$)

(3) from 5 to 25 mol per 100 mol of monomers (1)+(2) of one or a number of hydroxylated allylic monomers selected from the group consisting of hydroxylated allyl ethers and carboxylated allyl esters, (4) from 0 to 20 mol per 100 mol of monomers (1)+(2) at least one monomer selected from the group consisting of non-hydroxylated vinyl ethers,

8

(5) from 0 to 5 mol per 100 mol of monomers (1)+(2) of a plurality of other fluorinated monomer (meth)acrylate monomers selected from the group consisting of trifluoroethylene (meth)acrylate and (meth)acrylates carrying at least one $CF_3$—$(CF_2)_m$ group (m $\leq$ 7), wherein the epoxidized or alkoxylated acrylic monomers are obtained from the following monomers:

from 50 to 90% (by mass) of one or a number of alkyl (meth)acrylate(s), and from 10 to 50% (by mass), substituted by alkoxy or epoxy groups.

2. Binder composition according to claim 1, characterized in that the fluorinated copolymer(s) comprises from 60 to 70% (molar) of monomers ① from 30 to 40% (molar) of monomers ② from 10 to 25 mol of carboxylated allyl esters ③ and 0 to 10 mol of hydroxylated allyl ethers ③ per 100 mol of monomers ①+② from 0 to 20 mol of monomers ④ per 100 mol of monomers ①+② from 0 to 5 mol of monomers ⑤ per 100 mol of monomers ①+②.

3. Binder according to claim 1, wherein the fluorinated copolymers comprises VF2, C2F4, and $CH_2$=CH—$CH_2$—O—$CH_2$—$CH_2$—O—$CH_2$—CO—$C_6H_{10}$—COOH.

4. Binder according to claim 1, characterized in that the acrylic copolymers comprises MMA, butyl and/or ethyl acrylate, glycidyl (meth)acrylate and/or isobutoxymethylacrylamide.

5. Process for the preparation of the binders of claim 1, characterized in that the fluorinated copolymer(s) in solution in an organic solvent is/are mixed with the acrylic copolymer(s) in solution in an organic solvent or in the powder form.

6. Process for the preparation of the binders of claim 1, characterized in that the acrylic monomers are copolymerized in the presence of the fluorinated copolymer(s) in solution or in emulsion in an organic solvent.

7. Self-crosslinkable paints or varnishes in organic- or aqueous-phase containing the binders of claim 1.

8. Substrates coated with a self-crosslinkable varnish or paint as defined in claim 7.

9. Binder for cross-linkable varnishes and paints comprising a plurality of fluorinated copolymers containing chemical functionality selected from the group consisting of hydroxyl and carboxyl and a plurality of acrylic copolymers containing chemical functionality selected from the group consisting of epoxide and alkoxide, wherein the fluorinated copolymers are formed from the monomers (A), (B), (C), (D) and (E) wherein monomer (A) comprises from 45 to 85 (mole % ((A)+(B))) and is a monomer selected from the group consisting of vinylidene fluoride and trifluoroethylene;

monomer (B) comprises from 15 to 55 (mole % ((A)+(B))) and is tetrafluoroethylene;

monomer (C) comprises from (5 to 25 mole)/(100 mole ((A)+(B)) and is selected from the group consisting of hydroxylated allyl ethers and carboxylated allyl esters;

monomer (D) comprises (0 to 20 mole)/(100 mole ((A)+(B)) and is selected from the group of non-hydroxylated vinyl ethers; and monomer (E) comprises (0 to 5 mole)/(100 mole ((A)+(B)) and is selected from the group consisting of trifluoroethylene (meth)acrylate and (meth)acrylates containing at least one $CF_3—(CF_2)_m$ group, wherein m=5 to 7, and mixtures thereof; and wherein the acrylic copolymers are formed from monomers (F) and (G), wherein (F) comprises from 50 to 90% (by mass ((F)+(G)) and is selected from the group consisting of methyl methacrylate, butyl acrylate, ethyl(meth)acrylate and mixtures thereof; and (G) comprises from 10 to 50% (by mass ((F)+(G)) and is selected from the group glycidyl (meth)acrylate, isobutoxymethylacrylamide, methoxyethyl methacrylate, methoxymethyl methyacrylate or epoxydicylcopentadiene (meth)acrylates.

10. The binder of claim 9 wherein the acrylic copolymers are in the amounts by weight per 100 parts ((F) and (G)) of (35 to 45 parts) methyl methacrylate, (35–45 parts) butyl acrylate, and (15–25 parts) isobutoxymethylacrylamide.

11. The binder of claim 9 wherein the fluorinated copolymers are in the molar composition 60–70% vinylidene fluoride and 30–40% tetrafluoroethylene and wherein there are (1 to 9) moles monoallylhexahydrophthalate per 100 moles ((A)+(B)).

12. The binder according to claim 1 wherein the acrylic monomers of (5) comprise from 20 to 40% of one or a number of alkyl (meth)acrylate monomers substituted by alkoxy or epoxy groups selected from the group consisting of glycidyl (meth)acrylate (GLYMA), isobutoxymethylacrylamide (IBMA), methoxyethyle methacrylate (EEMA), methoxymethyl methacrylate (MEMA) or epoxydicyclpentadiene (meth)acrylates:

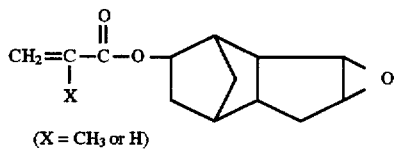

(X = CH₃ or H)

13. The binder according to claim 1 wherein the fluorinated monomer (meth)acrylate monomers are selected from the group consisting of
$CH_2=CH—CO—O—C_2H_4C_6F_{13}$ and
$CH_2=CH—CO—O—C_2H_4—C_8F_{17}$.

14. The binder according to claim 3, further comprising $CH_2=CH—CH_2—O—CH_2—CHOH—CH_2OH$.

15. A binder for cross-linkable varnishes or paints in organic phase or in aqueous dispersion comprising at least one fluorinated copolymer selected from the group consisting of hydroxylated and carboxylated fluorinated copolymers and at least one polymer selected from the group consisting of epoxidized and alkoxylated acrylic copolymers,
wherein the fluorinated copolymers comprise the following monomers:

(1) from 45 to 85% (molar) of polymers selected from the group consisting of vinylidene fluoride (VF2) and trifluoroethylene (VF3)

(2) from 15 to 55% (molar) of tetrafluoroethylene ($C_2F_4$)

(3) from 5 to 25 mol per 100 mol of monomers (1)+(2) of at least one hydroxylated allylic monomer selected from the group consisting of
$CH_2=CH—CH_2—O—(CH_2)_n—OH$ with $2\leq n\leq 4$
$CH_2=CH—CH_2—(O—CH_2—CH_2)_n—OH$ with $1\leq n\leq 4$
$CH_2=CH—CH_2—(O—CH_2—CH(CH_3))_n—OH$ with $1\leq n\leq 4$
$CH_2=CH—CH_2—O—CH_2—CHOH—CH_2OH$
$CH_2=CH—CH_2—O—CH_2—CH—(CH_2—CH_3)—(CH_2OH)2$
$CH_2=CH—CH_2—O—CO—C_6H_{10}—COOH$
$CH_2=CH—CH_2—O—CO—C_2H_4—COOH$ and
$CH_2=CH—CH_2—O—CH_2—CH_2—O—CO—C_6H_{10}—COOH$ (4) from 0 to 20 mol per 100 mol of monomers (1)+(2) of at least one monomer chosen from non-hydroxylated vinyl ethers (5) from 0 to 5 mol per 100 mol of monomers (1)+(2) of monomers comprising a (meth)acrylate carrying at least one $CF_3—(CF_2)_m$ group ($m\leq 7$), wherein the methacrylates comprise the following monomers:
from 50 to 90% (by mass) of at least one alkyl (meth)acrylate(s)
and from 10 to 50% (by mass) of at least one alkyl (meth)acrylate monomer substituted by alkoxy or epoxy groups.

16. The binder according to claim 15 wherein the monomers comprising (meth)acrylate carrying at least one $CF_3—(CF_2)_m$ group are selected from the group consisting of
$CH_2=CH—CO—O—C_2H_4—C_6F_{13}$ and
$CH_2=CH—CO—O—C_2H_4—C_8F_{17}$.

17. The binder according to claim 15 wherein the alkyl (meth)acrylate(s) of (5) are selected from the group consisting of methyl methacrylate (MMA), butyl acrylate (BuA) and ethyl methacrylate.

18. The binder according to claim 15 wherein the alkyl (meth)acrylate monomers substituted by alkoxy or epoxy groups of (5) are selected from the group consisting of glycidyl (meth)acrylate (GLYMA), isobutoxymethylacrylamide (IBMA), methoxyethyl methacrylate (EEMA), methoxymethyl methacrylate (MEMA) and epoxydicyclpentadiene (meth)acrylates:

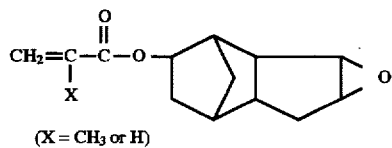

(X = CH₃ or H)

19. The binder according to claim 15 wherein the alkyl (meth)acrylate monomers substituted by alkoxy or epoxy groups of (5) comprise 20 to 40% by mass of the methacrylate of (5).

* * * * *